(No Model.)  
2 Sheets—Sheet 1.

C. H. MARTIN.
PIANO TRUCK.

No. 452,714.  
Patented May 19, 1891.

WITNESSES  
Samuel Ker.  
Josef A. Hagmann

INVENTOR  
Christian H. Martin  
By Myers & Co.  
Attorneys.

(No Model.)　　　　　C. H. MARTIN.　　2 Sheets—Sheet 2.
PIANO TRUCK.

No. 452,714.　　　　　　　Patented May 19, 1891.

WITNESSES
Samuel Ker
Joep A. Hagmann

INVENTOR
Christian H. Martin
By Ayers & Co.
Attorneys.

UNITED STATES PATENT OFFICE.

CHRISTIAN H. MARTIN, OF SIOUX CITY, IOWA.

PIANO-TRUCK.

SPECIFICATION forming part of Letters Patent No. 452,714, dated May 19, 1891.

Application filed January 7, 1891. Serial No. 377,002. (No model.)

*To all whom it may concern:*

Be it known that I, CHRISTIAN H. MARTIN, a citizen of the United States of America, residing at Sioux City, in the county of Woodbury and State of Iowa, have invented certain new and useful Improvements in Piano-Trucks, of which the following is a specification, reference being had therein to the accompanying drawings.

My invention relates to certain improvements in piano-trucks; and it consists in the novel construction and combination of parts as hereinafter disclosed.

Figure 1:
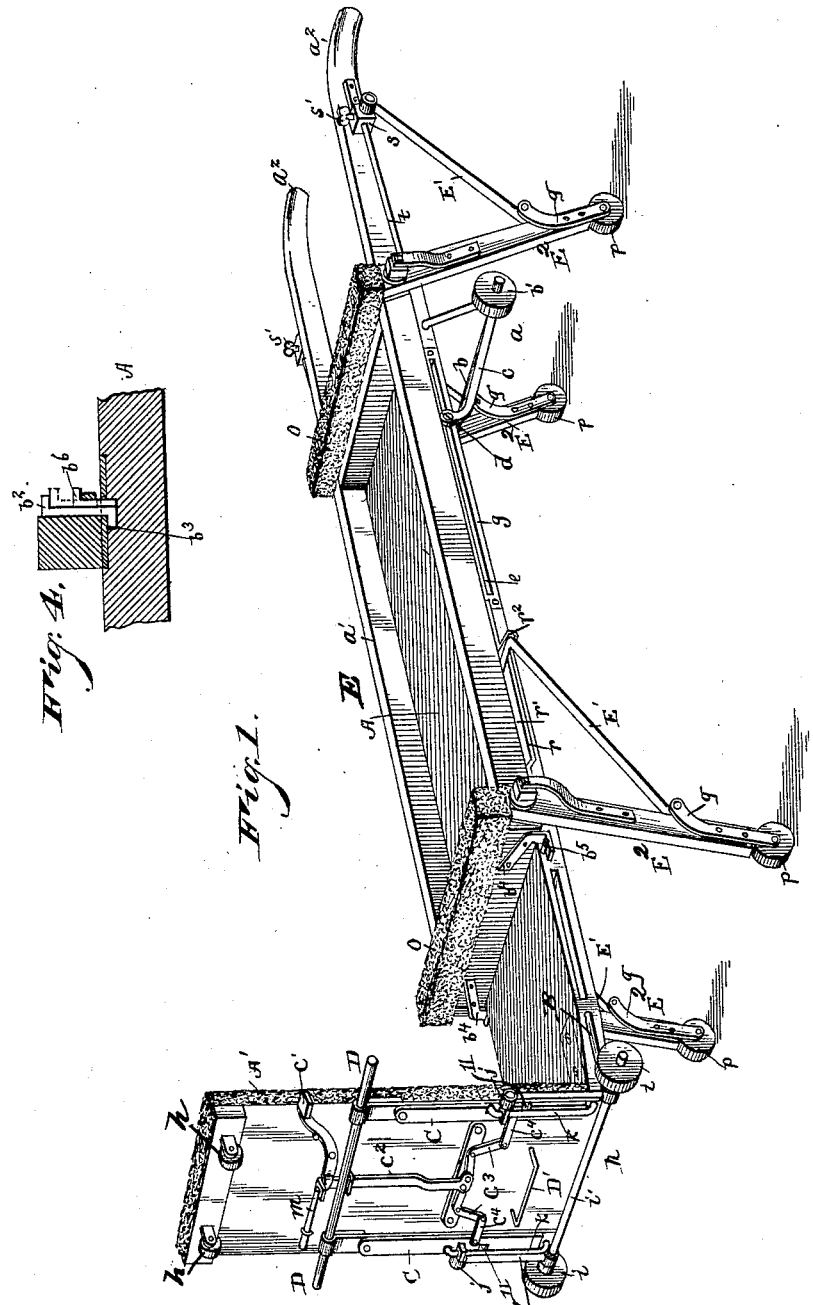
Figure 2:
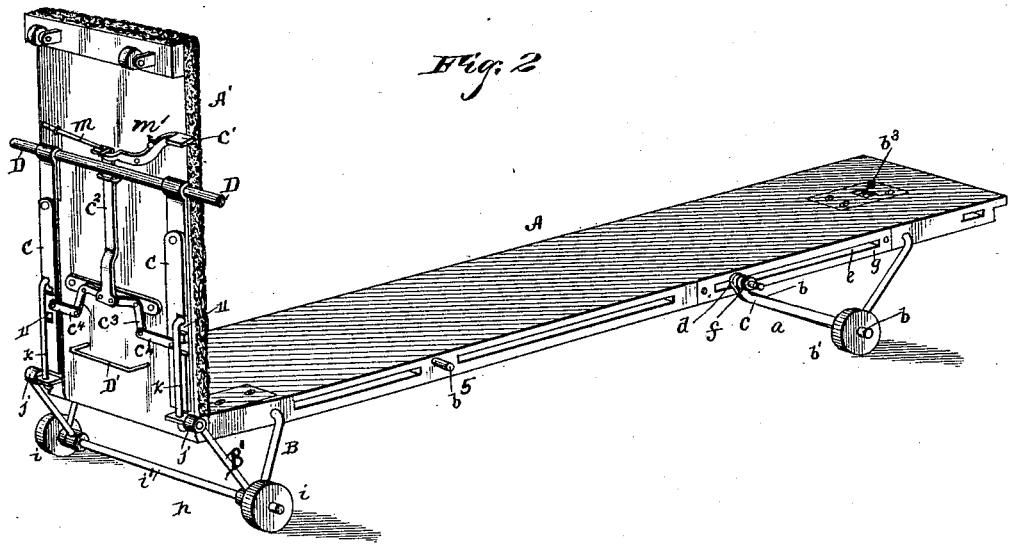
Figure 3:
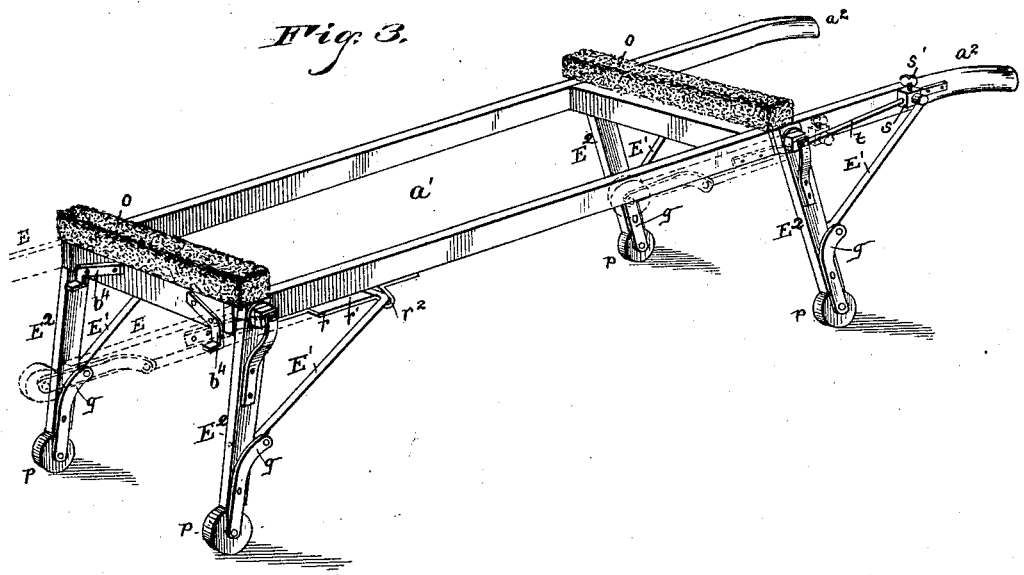

In the accompanying drawings, Figure 1 is a perspective view of my improved upright and grand or square piano truck combined. Fig. 2 is a perspective view of the upright-piano truck. Fig. 3 is a similar view of the square or grand piano truck attachment. Fig. 4 is a detail sectional view thereof, showing the means for effecting connection between one end of the truck and its attachment.

In carrying out my invention I employ for moving upright pianos the truck or skid A, having an upright end portion A' suitably cushioned or upholstered, as shown, to prevent marring the piano-casing. This truck or skid A has connected to it near one end a pivoted or swinging bail or lever $a$, carrying at the lower or outer looped ends of its arms an axle or shaft $b$, bearing rollers or trucks $b'$ $b'$. Said axle or shaft is connected by pivoted oblique braces or arms $c$ to a rod $d$, adapted to slide, and adjustably held in a longitudinal slot $e$ in the skid A by a milled or thumb nut or disk $f$, engaging a screw-thread on said rod and clamping one brace against the plate-like bars $g$ on one side of the skid, thus providing for the adjustment and retention of the bail with the axle and its rollers or trucks at any required angle to the skid, as required in climbing stairs, for instance, and according to the height of the step. In lieu of the nut, the brace itself may have a screw-thread connection with the rod. The end upright end portion A' has applied to it, at or near one end, small trucks or rollers $h$, for use when the truck, with its load or piano, is stood on end.

To aid in supporting and leveling the opposite end of the end portion A' of the truck when the latter is turned or stood on end, I provide an axle $i'$, carrying rollers or trucks $i$ and pivotally borne by arms B B', the arms B' having pivoted or swiveled eye-connections $j$, with rails $k$ $k$, secured to and standing outward, bail-like, from the end portion, the other arms B being pivoted in the side edges of the skid A, near the end portion A', as shown in Fig. 1.

The trucks or rollers $i$ $i$, with their axle and arms, are adapted for supporting the end of the skid A adjacent to the end portion A' when the skid is used with its longer side in a horizontal or vertical position, being capable of being shifted into either of the two positions, and accordingly locked by effecting the engagement of the eye-connections $j$ with the notches $l$ $l$ in the lower ends of the levers C, which are pivoted at their upper ends to said end portion. The levers C are actuated by a thumb-lever $c'$ engaging the upper laterally-projecting end of a slide-bar $c^2$, connecting at its lower end to the bell-cranks $c^3$, connected by links $c^4$ to the levers C, the upper laterally-projecting end of the slide-bar $c^2$ being pressed downward by means of a spring $m$, secured at one end to the end portion A'. A stop or projection $m'$ on the end portions A' limits the reactionary movement of the lever $c'$ under the action of the spring $m$ when released from the pressure of the thumb.

A hand-bar or rod D and a hand-hold D', secured to the end portion A', provide for the convenient manipulation or application of power to the truck for pulling or moving it.

E is the attachment for moving grand or square pianos, which consists of a rectangular frame $a'$, extended at one end into handles $a^2$, and provided at the same end with an inwardly-projected lug or catch $b^2$, engaging a corresponding socket $b^3$ in the skid A, and having at its other end lugs or catches $b^4$, engaging projections or studs $b^5$ on the sides of the skid A, thus effecting connection between said attachment and the latter.

In order to secure the lugs against accidental retraction, I provide also the sliding thumb-piece or latch $b^6$, adapted to slide upon the lug $b^2$, and also engage its socket, thus preventing endwise movement of the frame $a'$ upon skid A, which is first necessary, as is obvious, before the latter can be separated, this separation, however, being effected, as readily understood, when the contrivance is to be used for moving upright pianos.

Upon the end cross-pieces of the frame $a'$ are secured cushioned or plush-covered supports or rests $o$ $o$ for the piano to rest on, and to this frame is provided folding or pivoted legs E, having at their lower ends trucks or rollers $p$ for use in their extended or upright position to substitute the rollers or trucks of the skid proper, in that case the latter trucks or rollers being folded against the under side of the skid out of use.

The legs $E^2$ are provided with brace-rods $E'$, having pivotal connection at one end with and between the outwardly-curved upper ends of the truck or roller-carrying bars or hangers $q$, secured to the legs $E^2$; the opposite ends of one pair of said brace-rods being hooked and sliding in slots, forming bracket $r$, the slots $r'$ thereof terminating in downward extensions or sockets $r^2$, locking said brace-rods in their extended position. The other pair of brace-rods $E'$ are provided with pivoted slides $s$, carried by or sliding on rods or rails $t$, secured to the handles $a^2$, said slides being provided with adjusting-screws $s'$ to effect their retention at the desired point of adjustment.

Having thus fully described my invention, what I claim, and desire to secure by Letters Patent, is—

1. The skid having the roller or truck carrying axle pivotally borne by arms, two of said arms being pivoted to the longer horizontal portion of the skid, and two of said arms having pivoted sliding connections with rails standing bail-like outward from the short end portion of the skid, in combination with the notched levers adapted to engage the sliding pivoted connections of the latter arms, substantially as set forth.

2. The skid having the roller or truck carrying axle pivotally borne by arms, two of said arms being pivoted to the longer horizontal portion of the skid and the other arms having sliding pivoted connections with rails standing bail-like outward from and secured to the short end portion of the skid, in combination with the notched levers adapted to engage said sliding pivoted connections and connected together by bell-cranks and a sliding bar, and the spring-pressed thumb or finger lever adapted to actuate said sliding bar, substantially as set forth.

3. The skid having the attachment provided with folding and extensible legs and handles, and having at one end the sliding catch adapted to engage a socket in the truck, and a slide locking said catch in place, and having at the other end lugs or catches engaging projections or studs on the sides of the truck, substantially as set forth.

In testimony whereof I affix my signature in presence of two witnesses.

CHRISTIAN H. MARTIN.

Witnesses:
M. E. REED,
D. W. MARTIN.